J. H. STEWART.
METHOD OF MOLDING COUNTERS.
APPLICATION FILED APR. 25, 1911.
1,108,409.
Patented Aug. 25, 1914.
2 SHEETS—SHEET 1.
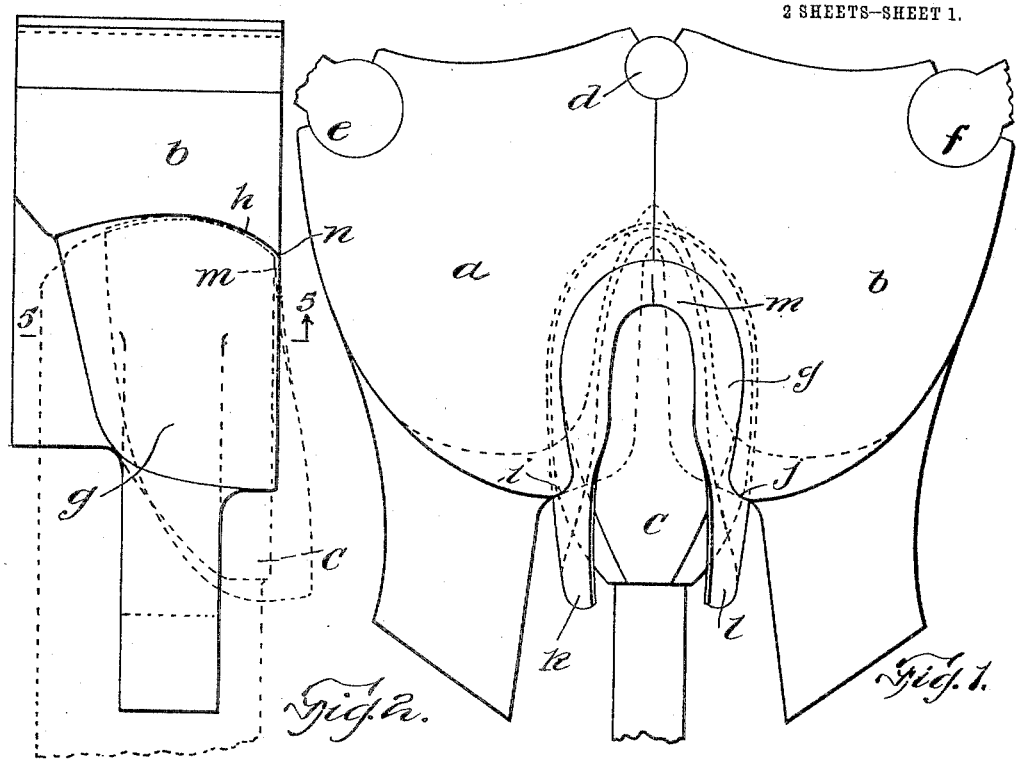
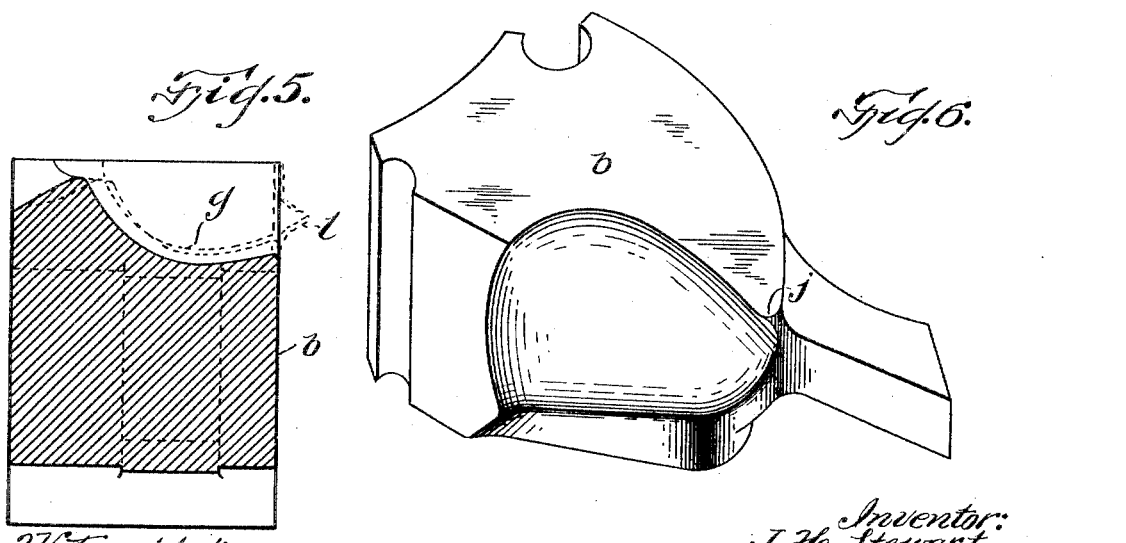

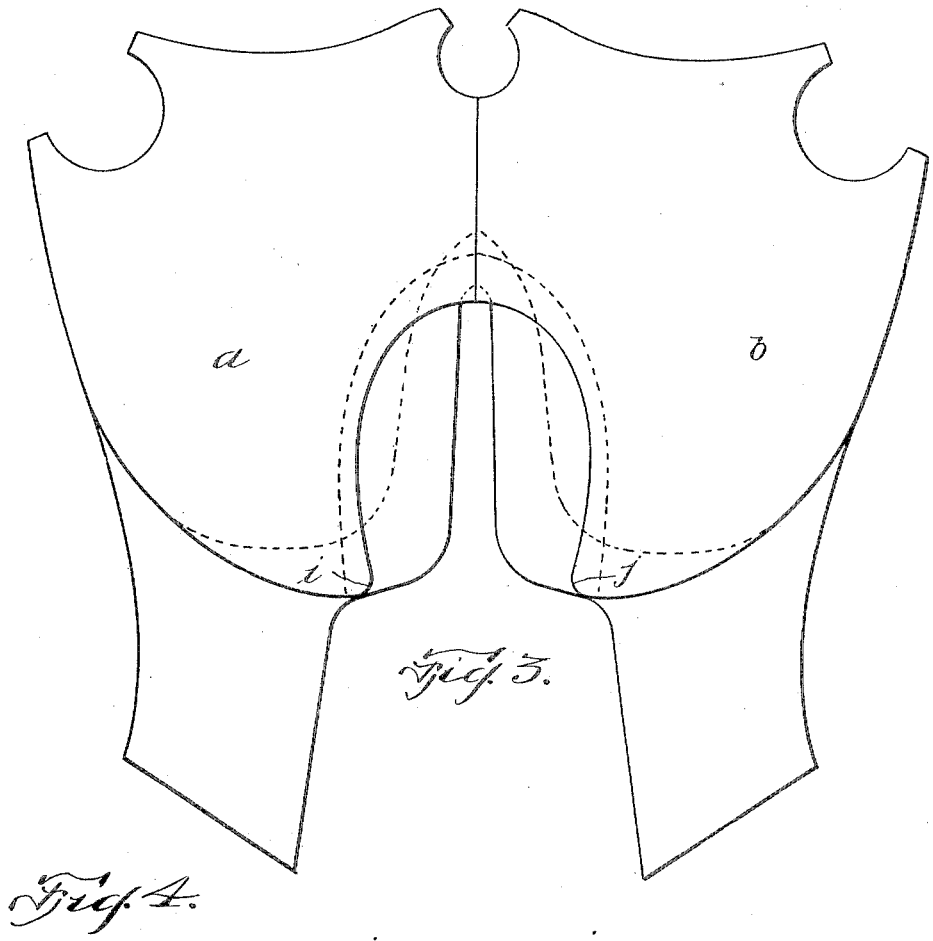
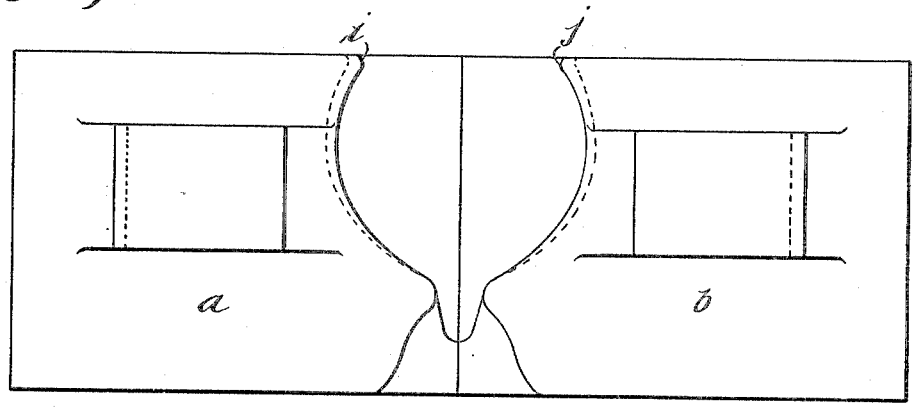

UNITED STATES PATENT OFFICE.

JOHN H. STEWART, OF LYNN, MASSACHUSETTS.

METHOD OF MOLDING COUNTERS.

1,108,409.  Specification of Letters Patent.  Patented Aug. 25, 1914.

Application filed April 25, 1911. Serial No. 623,276.

*To all whom it may concern:*

Be it known that I, JOHN H. STEWART, of Lynn, in the county of Essex and State of Massachusetts, have invented certain new and useful Improvements in Methods of Molding Counters, of which the following is a specification.

The present invention relates to counters for stiffening the back parts of boots and shoes, and to a method of producing a new and improved form of counter.

The object of the invention is to produce a counter suitable for use in Goodyear welt shoes having a flange only at its rear part and having the ends of its sides flexible and smooth, or in other words, free from sharp bends.

The manner in which I accomplish the objects of this invention is, briefly stated, by limiting the area of the counter which is gripped by the mold when its edge is bent over to form the flange, to the rear part only of the counter, leaving the ends of the counter free and unconfined so that they may give way freely when the flange former is carried over them and may resume their former shape when the pressure of such former has been removed.

Another object of the invention is to condense and compress the rear part of the counter where alone great stiffness is required to a greater extent than heretofore; whereby equally good results, in producing stiff counters, may be obtained with the use of lighter stock.

In the drawings, forming part of this application, I have illustrated so much of a molding apparatus as is necessary to an understanding of the invention.

Figure 1 is a front elevation of the molding apparatus showing a counter in place in such apparatus. Fig. 2 is an elevation as seen from the left of Fig. 1 of a part of the molding apparatus. Fig. 3 is an elevation on an enlarged scale of the mold with the counter removed. Fig. 4 is a view of the same as seen from underneath. Fig. 5 is a section of ½ of the mold on line 5—5 of Fig. 2. Fig. 6 is a perspective view of ½ of the mold.

The same reference characters indicate the same parts in all of the views.

The apparatus which I employ for carrying my invention into effect consists of a two-part divided outer mold the members of which are respectively designated by $a$ and $b$, and an inner mold $c$, the latter being commonly designated in the art as a plug or last. For convenience of description, this part will be referred to in this specification as the last. The mold and last are capable of being used in a counter molding machine, in a manner similar to that in which the hollow molds and lasts have heretofore been employed. The counter blank is placed outside of the last, the members of the divided mold $a$, $b$ being then spread apart, and these parts are then closed upon the exterior of the counter blank. As here shown, the parts $a$ and $b$ in separating and coming together, pivot upon a pin $d$ which is set partly into each member and they are operated by toggle levers or equivalent means indicated at $e$ and $f$. The exterior of the last and the interior of the mold have similar contours, being so shaped that they will fit accurately against the inner and outer surfaces respectively of a counter and enable a uniform pressure to be applied to that portion of the counter which is contained between them.

When the counter is placed in the mold its bottom edge extends out from the face of the mold, and a wiper or presser which travels across the face of the mold strikes and passes across this outstanding edge, laying it against the face of the last and gripping it. The wiper is not illustrated in these drawings, since it does not differ essentially from corresponding elements previously used in counter molding machines, such for instance, as shown in the patent to Stewart, 467,763, dated Jan. 19, 1892. At the same time that the wiper lays over the edge of the counter it exerts a severe pressure thereupon to compress the flange formed thereby and cause the latter to retain its form and position.

The improvements in which the present invention resides consist in so gripping the counter that only its central and rear part is confined, its ends being free. As shown in Fig. 2, where $g$ represents the counter as a whole, its rear portion $h$ is gripped between the last and mold up to the points $i$ $j$, leaving the wings or tips $k$ $l$ of the sides of the counter free and unconfined. The points $i$ and $j$ where the gripping surfaces of the molds terminate are well back of the extreme ends of the tips $k$ and $l$ and may be as far back as the longitudinal middle of the counter. Preferably they are about at the points where the breast of the heel will come when the counter is built into a complete shoe. In other words, this feature of my invention consists in terminating the gripping surfaces of the molds a considerable distance short of the tips of the counter instead of continuing them throughout the entire length of the counter as has been the universal practice heretofore.

In molding the counter as described, an exceedingly severe pressure is applied by molds $a$ and $b$ so that the counter is gripped with a great force between the surfaces of the latter and the last. When the wiper or presser is passed over the outstanding edge of the counter, and at the same time held forcibly against the face of the mold and last, such edge must necessarily be bent inward around the edges of the last, since the gripped part of the counter cannot yield in the least. In this way the flange $m$ is given a permanent set. The flange makes a comparatively sharp angle with the back of the counter and the rear parts of its sides, as shown in Fig. 2, and a crease $n$ is formed. When the presser passes over the outward edges of the wing $k$ and $l$, however, these wings being free to yield, give way under the presser and their edges are not flanged over. When the presser returns to its normal position the wings resume their former shape, lying somewhat as shown in Figs. 1 and 2. They have no permanent flanges and are not creased, the crease $n$ wholly disappearing in the vicinity of the points $i$ and $j$. Thus the completed counter, while being compressed, flanged, and stiffened at the rear part is left flexible and flangeless at the forward ends. These ends may thus, when the counter is made up into a welted shoe, be stitched to the inner sole of the shoe and will conform to the shape of the upper leather at the shank of the shoe without forming a projecting ridge or otherwise distorting the leather. Such counter is therefore useful in places where the molded counters as heretofore made cannot be applied.

Another important feature of the present invention is that the entire pressure which is applied to the molds $a$ and $b$ is concentrated over a smaller area of the counter than heretofore, and the counter is thus compressed with a greater unit pressure than heretofore. That is, the total pressure of the machine applied through molds constructed as here shown gives more intense compression than can be applied by the molds previously used which engage the entire surface of the counter and so distribute the total force over a greater area. Thus, for obtaining the same results of stiffness and density as heretofore, less expensive stock may be used and a saving thereby effected.

I claim:—

The improvement in the art of molding counters for boots and shoes to furnish counters having flangeless, flexible tips, which consists in gripping the counter blank at its rear bent portion only, leaving the tips unconfined, and so holding the blank that an edge of such gripped portion projects beyond the gripping means, and bending such edge sharply over to form a permanent flange at the gripped part of the counter.

In testimony whereof I have affixed my signature, in presence of two witnesses.

JOHN H. STEWART.

Witnesses:
A. H. BROWN,
J. M. MURPHY.

Copies of this patent may be obtained for five cents each, by addressing the "Commissioner of Patents, Washington, D. C."